Sept. 29, 1959  W. A. RICE  2,906,031
TWO-WAY PLUMB AND LEVEL
Filed April 15, 1957
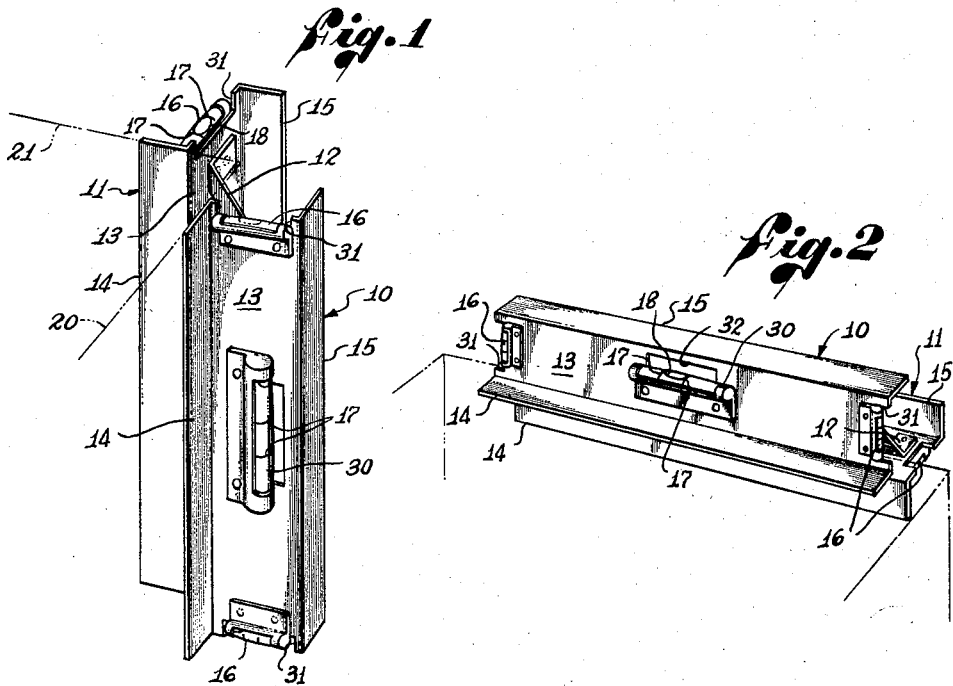
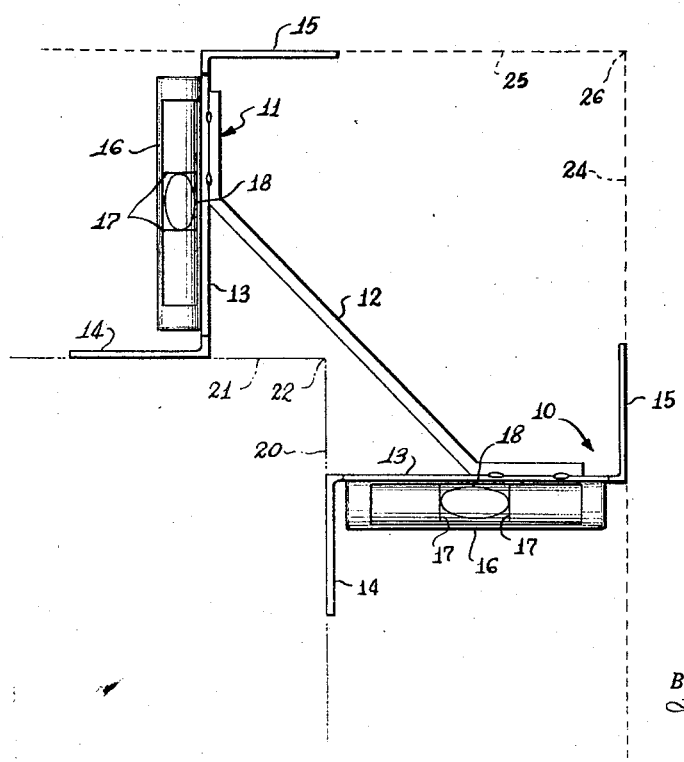
INVENTOR.
WILLIAM A. RICE
BY
Fulwider Mattingly & Huntley
Attorneys

United States Patent Office 2,906,031
Patented Sept. 29, 1959

2,906,031

TWO-WAY PLUMB AND LEVEL

William A. Rice, Glendale, Calif.

Application April 15, 1957, Serial No. 652,830

3 Claims. (Cl. 33—207)

This invention relates generally to hand tools and more particularly to tools of this type generally known as a level or plumb, and used to determine whether a surface is truly horizontal or vertical, respectively.

In the construction of buildings, walls are generally designed to be vertical, and openings in these walls, such as for doors, windows, etc., are likewise intended to be vertical. There are thus two perpendicular surfaces that are intended to be vertical, one surface being that of the wall itself, and the other surface being that of the end of the wall or the edge of the opening. Two separate measurements or checks must thus be made to determine the accuracy of the work, and this can be a time-consuming process.

The customary carpenter's level, intended originally to indicate whether or not a surface is horizontal, is usually provided with a horizontal spirit level and one or more additional spirit levels perpendicular to the principal or horizontal level and used to indicate when a surface is vertical. When used in its vertical position, the device is generally referred to as a plumb, and the conventional carpenter's level is probably used with equal frequency as a plumb and as a level.

In the construction of walls from individual building elements, such as bricks, concrete blocks, etc., it is important that the units be laid so that they are generally horizontal, with the surface of the wall vertical, and any openings in the wall likewise being vertical. A mason who takes pride in his work makes frequent use of both a plumb and a level to ensure that the individual building units or bricks meet the requirements mentioned, and the present invention provides a device that materially aids in the proper construction of walls, etc., by providing in a single instrument a level, and a plumb that will indicate simultaneously the verticality of the surface of the wall and any openings therein. The verticality of the wall and the verticality of the opening are separately indicated, so that confusion is avoided and time and motions are reduced.

It is a major object of the present invention to provide an improved plumb and level.

Another object of the invention is to provide such an instrument that will simultaneously indicate the verticality of two independent, perpendicular surfaces.

It is a further object of the invention to provide a hand tool of this type that, while being used as a level, can simultaneously be used as a plumb for a perpendicular surface, such as might occur in the building of steps.

Still another object of the invention is to provide a hand tool that can be used to determine the accuracy of vertical positioning of walls that meet to form either an exterior or an interior angle.

It is a still further object of the invention to provide such a hand tool of simple and rugged construction that can withstand the rough treatment to which such tools are customarily subjected, while still being so simply manufactured that it may be sold at a low cost.

These and other objects and advantages of the invention will become apparent from the following description of a preferred form thereof, and from the drawings illustrating that form in which:

Figure 1 is a perspective view of the tool as it may be used in checking an exterior corner of a wall, the wall being indicated in phantom outline;

Figure 2 is a perspective view of the tool used as a level;

Figure 3 is a top plan view of the tool, showing its use in checking both interior and exterior corners.

By reference to Figure 1, it will be seen that the two-way plumb and level of the present invention includes a pair of members 10 and 11 of elongated form, held together by connecting members 12. The members 10 and 11 are similar, and each includes a body portion, here shown as the web 13 of a generally Z-shaped extrusion, with perpendicular flanges 14 and 15.

The longitudinal axes of the webs 13 are parallel to each other, and the outer surfaces of the flanges 14, the surfaces most remote from the webs 13, are perpendicular to each other. The exterior surfaces of the flanges 15 are similarly arranged so that they are perpendicular to each other, as best shown in Figure 3. The outer surfaces of the flanges 14 and 15 of the member 10 are thus parallel to each other, and the same is true of the outer surfaces of the flanges 14 and 15 of the member 11.

Mounted upon each end of each of the webs 13 is a tubular type spirit level 16 so positioned that when the outer or bearing surface of the flange 14 is vertical, the bubble in the spirit level is centered, in accordance with conventional practice. Tubular spirit levels are well known, and usually include a pair of spaced indicia such as lines 17 between which a bubble 18 is centered when the spirit level is horizontal. In the construction here shown, the spirit level 16 is horizontal when the outer surface of the flange 14 is vertical, and, as previously indicated, the same conditions exist when the outer surface of the flange 15 is vertical.

The members 10 and 11 are spaced or separated so that their respective webs 13 do not meet, but are separated a short distance from each other. The flange 14 of the member 10 projects in a direction away from the other member 11, and the flange 14 of the member 11 projects in a direction away from the member 10 so that an unobstructed space is left between the intersection of the web 13 with flange 14 of the member 10, and the corresponding intersection of the member 11. The extension 20 of the plane formed by the outer surface of the flange 14 intersects with the extension of the plane of the outer face of the flange 14 of the member 11 to form a dihedral angle 22 whose apex is located in the space between the webs 13 of the members 10 and 11. The connecting member 12 is positioned to be located outside the space occupied by the dihedral angle formed by the planes 20 and 21.

It will be recognized that the planes 20 and 21 may represent the plane of the end or opening of a wall, and the plane of the wall, respectively. By locating the webs 13 and their respective flanges 14 away from the apex 22 of the dihedral angle, inaccuracies resulting from the rounding of the corner or from irregularities at the corner are avoided. The planes 20 and 21, corresponding to the end and side of a wall, form an exterior angle. An interior angle, such as might be formed by the intersection of two walls, is indicated in Figure 3 by the planes 24 and 25, which intersect to form a dihedral angle having an apex 26. The plane 24 is parallel to the plane 20, and the plane 25 is parallel to the plane 21. Thus the verticality of the walls corresponding to the planes 24 and 25 may simultaneously be determined in the same manner that the verticality of the surfaces 20 and 21 is determined.

To check the verticality of a pair of surfaces intersecting to form an exterior angle, as a mason might check the verticality of a wall and an opening therein, the tool is preferably grasped in the hand, as by placing the thumb against the web 13 of the member 10, and extending the fingers around the flange 15 and to the web 13 of the member 11, and placing the tool with the outer surfaces of the flanges 14 bearing against the surfaces or planes 20 and 21. Generally, it is desirable to move the tool up and down a slight amount to dislodge any particles that may be caught between the flanges 14 and the corresponding planes 20 and 21, and also to ensure that a firm contact is made. By then checking the spirit levels 16, the verticality of the surfaces can be determined. When an interior angle, such as that formed by the intersection of two walls, corresponding to the planes 24 and 25, is to be determined, the tool may be grasped by the flanges 14 and then applied to the surfaces in the same general manner, using the same rubbing motion to dislodge any particles.

To permit the tool to be used as a level, an additional spirit level 30 is mounted on each of the webs 13 in such a manner that when the surface of the outer face of the flange 14 of the corresponding member is horizontal, the bubble in the spirit level will be centered between a pair of indicia or lines. Thus, to determine whether or not the tread of a step is horizontal, and at the same time to determine if the adjacent riser is vertical, the tool is placed with one of the members, such as the member 10, with its flange 14 bearing against the tread, and the similar flange 14 of the other member 11 bearing against the riser. This operation is indicated in Figure 2. The spirit level 30 will then indicate whether or not the forward edge of the tread is horizontal, while the spirit level 16 of the member 11 will indicate whether or not the riser is vertical.

In order that the spirit levels 16 and 30 may be more easily viewed from different positions, the web 13 is preferably cut away adjacent each of the spirit levels. The end levels 16 are mounted on the web 13 adjacent a notch 31, and an opening 32 is formed in the web 13 adjacent the spirit level 30. In this way, all necessary spirit levels may be checked from one position.

It will be appreciated that modifications may easily be made in the form of the body members 10 and 11. Thus, if interior angles are not to be measured, the flanges 15 may be omitted and the webs 13 given some more convenient form. Likewise, it is possible to extend the width of the flanges 14 to cover a greater area, or to reduce the width of these flanges so that less bearing surface is presented to the walls or planes. However, if the flanges 14 are completely eliminated so that only the edges of the webs 13 bear against the planes 20 and 21, there is a danger that the webs will not be truly perpendicular to their corresponding planes 20 and 21, and inaccuracies may result.

From the foregoing, it will be seen that while there has been presented a device fully capable of achieving the objects and securing the advantages heretofore set forth, modifications may be made that are apparent to those skilled in the art without departing from the broad concepts of the invention. Consequently, the invention is not to be restricted to the particular form or arrangement of parts herein described and shown, except as limited by the claims.

I claim:

1. A device of the character described which includes: a first generally Z-shaped member having a web with a pair of flanges thereon, the outer surfaces of said flanges being parallel to each other; a second generally Z-shaped member having a web with a pair of flanges thereon, the outer surfaces of said flanges being parallel to each other; connecting means joining said first and second Z-shaped members and holding them spaced apart but linearly co-extensive, the planes of said outer surfaces of said first member being perpendicular to the planes of said outer surfaces of said second member, the extended planes of corresponding outer surfaces of said first and second members intersecting to form dihedral angles and said connecting means lying between and spaced apart from the apices of both said dihedral angles; a first level means on said first member to indicate the verticality of said outer surfaces thereof; and a second level means on said second member to indicate the verticality of said outer surfaces thereof.

2. A device of the character described which includes: a first generally Z-shaped member having a web with a pair of flanges thereon, the outer surfaces of said flanges being parallel to each other; a second generally Z-shaped member having a web with a pair of flanges thereon, the outer surfaces of said flanges being parallel to each other and substantially perpendicular to said web; connecting means joining said first and second Z-shaped members to form a rigid unitary structure in which said first and second members are substantially linearly co-extensive, the outer surface of one of said flanges of said first member being adjacent and perpendicular to, but spaced from, the outer surface of the corresponding one of said flanges of said second member, the extended planes of said surfaces of said adjacent flanges intersecting to form a dihedral angle, with said flanges projecting from their corresponding webs and away from the vertex of said dihedral angle, the extended planes of the said outer surfaces of the remaining flanges intersecting to form another dihedral angle toward whose vertex said remaining flanges project and said connecting means lying between and spaced apart from the apices of both said dihedral angles; a first level means on said first member to indicate the verticality of said outer surfaces thereof; and a second level means on said second member to indicate the verticality of said outer surfaces thereof.

3. A device of the character described which includes: a first generally Z-shaped member having a web with a pair of flanges thereon, the outer surfaces of said flanges being parallel to each other and substantially perpendicular to said web; a second generally Z-shaped member having a web with a pair of flanges thereon, the outer surfaces of said flanges being parallel to each other and substantially perpendicular to said web; connecting means joining said webs of said first and second Z-shaped members to form a rigid unitary structure in which said first and second members are substantially linearly co-extensive and said webs of said members are substantially perpendicular, the adjacent ends of said webs being spaced from each other and the said flanges attached to said adjacent web ends projecting away from each other, the extended planes of said flanges of said adjacent web ends intersecting to form a right dihedral angle that excludes said connecting means, the extended planes of said flanges of the remote web ends intersecting to form another right dihedral angle with said flanges of said remote web ends projecting toward the vertex thereof said connecting means being disposed within said other right dihedral angle and spaced apart from said vertex; a first level means on said first member to indicate the verticality of said outer surfaces thereof; and a second level means on said second member to indicate the verticality of said outer surfaces thereof.

References Cited in the file of this patent

UNITED STATES PATENTS

| 458,464 | Kelley | Aug. 25, 1891 |
|---|---|---|
| 1,554,417 | Dean | Sept. 22, 1925 |

FOREIGN PATENTS

| 67,128 | Switzerland | Oct. 2, 1913 |